US012585884B2

(12) United States Patent
Mizukami et al.

(10) Patent No.: US 12,585,884 B2
(45) Date of Patent: Mar. 24, 2026

(54) DIALOGUE APPARATUS, DIALOGUE METHOD, AND PROGRAM

(71) Applicant: NTT, Inc.

(72) Inventors: Masahiro Mizukami, Tokyo (JP);
Ryuichiro Higashinaka, Tokyo (JP)

(73) Assignee: NTT, Inc., Tokyo (JP)

( * ) Notice: Subject to any disclaimer, the term of this patent is extended or adjusted under 35 U.S.C. 154(b) by 201 days.

(21) Appl. No.: 18/561,788

(22) PCT Filed: May 24, 2021

(86) PCT No.: PCT/JP2021/019516
§ 371 (c)(1),
(2) Date: Nov. 17, 2023

(87) PCT Pub. No.: WO2022/249222
PCT Pub. Date: Dec. 1, 2022

(65) Prior Publication Data
US 2024/0242036 A1 Jul. 18, 2024

(51) Int. Cl.
*G06F 40/35* (2020.01)

(52) U.S. Cl.
CPC .................................... *G06F 40/35* (2020.01)

(58) Field of Classification Search
USPC .............. 704/7–10, 257, 246, 247, 251, 252
See application file for complete search history.

(56) References Cited

U.S. PATENT DOCUMENTS

| 10,332,033 | B2 * | 6/2019 | Kwon | .................... G06F 40/169 |
| 2014/0136212 | A1 * | 5/2014 | Kwon | ...................... G10L 15/22 |
| | | | | 704/275 |
| 2018/0090132 | A1 * | 3/2018 | Ikeno | .................. G10L 15/1815 |

(Continued)

FOREIGN PATENT DOCUMENTS

| JP | 2020067584 A | 4/2020 |
| JP | 2020119221 A | 8/2020 |

OTHER PUBLICATIONS

Web page (2020) "13. Kyomachi Seika will guide you!", NTT Communication Science Laboratories Open House 2020, Jun. 4, 2020, Internet: <URL: https://www.rd.ntt/cs/event/openhouse/2020/exhibition13/index.html>.

(Continued)

*Primary Examiner* — Leonard Saint-Cyr

(57) ABSTRACT
An example storage unit (10-1) stores examples including an utterance sentence, a response sentence, and situation information. A selection rule storage unit (10-3) stores a selection rule including a dialogue state, available situation information, and a dialogue state of a transition destination. An utterance reception unit (12) receives a user utterance uttered. A dialogue state acquisition unit (13) acquires a current dialogue state. An example selection unit (14) selects a selection example in which the situation information corresponds to situation information available in the current dialogue state and the utterance sentence corresponds to the user utterance, from the examples, by using the selection rule. A dialogue state update unit (15) updates the current dialogue state to the dialogue state of the transition destination included in the selection rule. An utterance presentation unit (16) presents a system utterance based on a response sentence included in the selection example.

9 Claims, 5 Drawing Sheets

(56) References Cited

U.S. PATENT DOCUMENTS

2021/0005187 A1* 1/2021 Shin ..................... G06V 20/40
2021/0303263 A1* 9/2021 Kim .................. B60R 16/0231

OTHER PUBLICATIONS

Description of Movies (2020) "13. Kyomachi Seika will guide you!", NTT Communication Science Laboratories Open House 2020, Jun. 4, 2020, Internet: <URL: https://www.youtube.com/watch?v=IknsMZVjWrU>.
Web page, NTT Holding Company News Release (2020) "Commencement of Joint Experiment on AI Dialogue System with Seika Town ~ Narikiri AI Kyomachi Seika will guide you! ~", Jul. 3, 2020, Internet: <URL: https://www.ntt.co.jp/news2020/2007/200703a.html>.
"Case Study of Expert System" (1986) Japan Information Processing Development Center, Apr. 1986.
Higashinaka et al. (2018) "Role play-based question answering by real users for building chat bots with consistent personalities", Proceedings of the Sigdial 2018 Conference, pp. 264-272, Jul. 2018.

* cited by examiner

USER UTTERANCE

DIALOGUE METHOD

DIALOGUE APPARATUS, DIALOGUE METHOD, AND PROGRAM

CROSS-REFERENCE TO RELATED APPLICATIONS

This application is a U.S. 371 Application of International Patent Application No. PCT/JP2021/019516, filed on 24 May 2021, the disclosure of which is hereby incorporated herein by reference in its entirety.

TECHNICAL FIELD

The present invention relates to a technology for performing dialogue with a human by using a natural language.

BACKGROUND ART

With progress of voice recognition technology, voice synthesis technology, and the like, a dialogue system has been widely used that performs dialogue with a human by using a natural language. Dialogue systems are generally classified into task-oriented dialogue systems (hereinafter, also referred to as a "task dialogue systems") for achieving predetermined tasks and non-task-oriented dialogue systems (also generally referred to as to as "chat dialogue systems") that are intended for dialogue itself. There are various technologies for constructing the dialogue systems, but in many cases, a scenario method or an example method is used.

The scenario method is a technology mainly used in the task dialogue systems. In the scenario method, a scenario for achieving a purpose of dialogue is prepared in advance, and the dialogue system executes the dialogue with the user in accordance with the scenario. For example, in a case of a dialogue about submission of a final tax return document, the purpose of the dialogue is to teach the user about the final tax return document to be submitted so that the user can appropriately submit the final tax return document. In the scenario method, in many cases, an expert having expertise creates a scenario. For that reason, it is often referred to as an expert system (see, for example, Non Patent Literature 1).

The example method is a technology mainly used in the chat dialogue systems. In the example method, a simple utterance and response rule (if the user makes an utterance in this way, the system responds in this way) called an example is prepared in advance, and the dialogue system executes dialogue with the user by uttering a response to an utterance of the user in accordance with the rule. In the example method, for example, an example is prepared by using a method of automatically generating the example on the basis of a dialogue performed on a social networking service (SNS), a method of creating the example by a plurality of users who completely plays a role of a specific character, or the like (see, for example, Non Patent Literature 2).

CITATION LIST

Non Patent Literature

Non Patent Literature 1: "Case Study of Expert System", Japan Information Processing Development Center, April 1986
Non Patent Literature 2: Ryuichiro Higashinaka, Masahiro Mizukami, Hidetoshi Kawabata, Emi Yamaguchi, Noritake Adachi, and Junji Tomita, "Role play-based question-answering by real users for building chatbots with consistent personalities", Proceedings of the SIG-DIAL 2018 Conference, pages 264-272, July 2018.

SUMMARY OF INVENTION

Technical Problem

A dialogue system that executes a task requiring expertise, such as an expert system, adopts a scenario method in which an expert manually creates a scenario, and thus requires a very large amount of cost for construction. In addition, to construct a dialogue system that simultaneously executes a plurality of tasks, it is necessary to appropriately combine scenarios created by a plurality of experts, and thus, more cost is required than constructing a dialogue system that executes a single task.

In view of the above technical problems, an object of the present invention is to construct a dialogue system for achieving a predetermined task at low cost.

Solution to Problem

A dialogue apparatus of an aspect of the present invention includes: an example storage unit that stores a plurality of examples including an utterance sentence, a response sentence, and situation information; a selection rule storage unit that stores a selection rule including a dialogue state, situation information available in the dialogue state, and a dialogue state of a transition destination when an example of the situation information is selected; an utterance reception unit that receives a user utterance uttered by a user; an example selection unit that selects a selection example in which the situation information corresponds to situation information available in a current dialogue state and the utterance sentence corresponds to the user utterance, from the plurality of examples, by using the selection rule; and an utterance presentation unit that presents, to the user, a system utterance based on a response sentence included in the selection example.

Advantageous Effects of Invention

According to the present invention, a dialogue system for achieving a predetermined task can be constructed at low cost.

DESCRIPTION OF EMBODIMENTS

Figure 1:
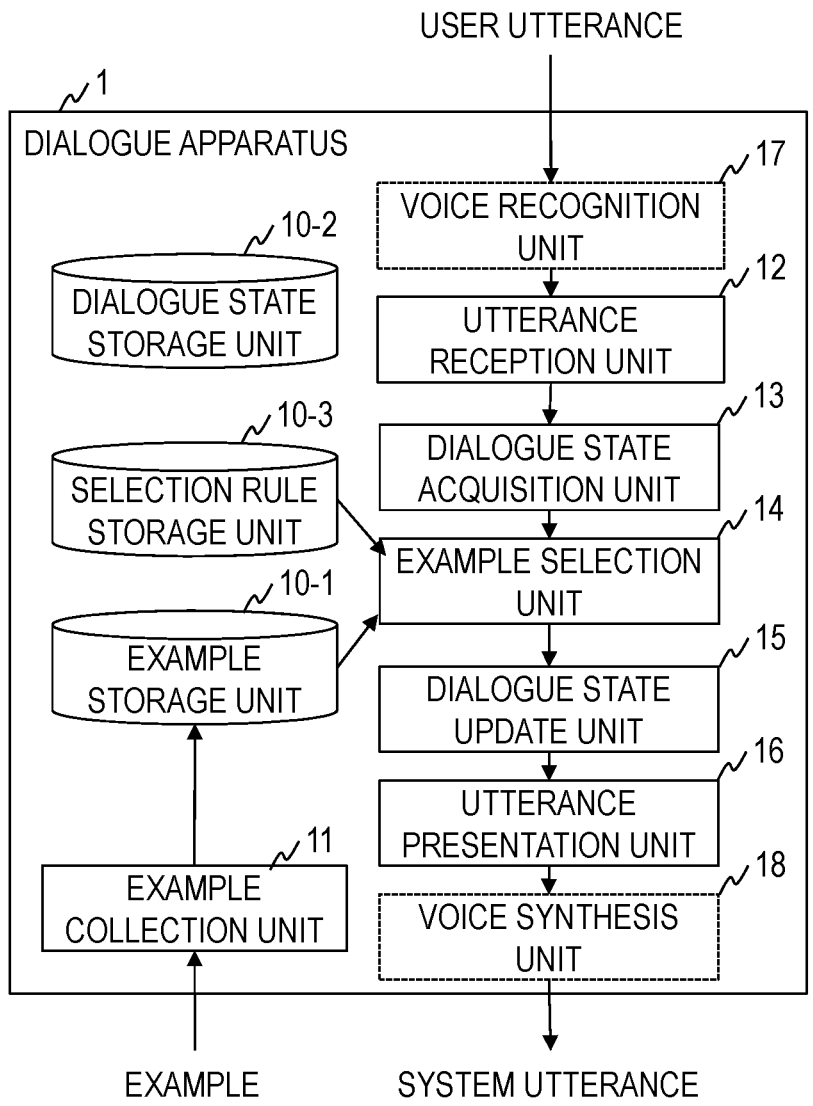
FIG. 1 is a diagram illustrating a functional configuration of a dialogue apparatus of a first embodiment.

Hereinafter, an embodiment of the present invention will be described in detail. In the drawings, constituents having the same functions are denoted by the same reference numerals, and redundant description will be omitted.

First Embodiment

A first embodiment of the present invention is a dialogue apparatus and a dialogue method that can simultaneously execute various tasks and can be constructed at low cost without requiring labor of experts. The present invention solves the above-described problem by introducing two elemental technologies of (1) collection of an example to which situation information is assigned by a non-expert, and (2) response selection depending on a situation by dialogue control. Many non-experts create examples of content that they can answer with confidence (that is, they partially have knowledge close to expertise), whereby it is possible to construct a database in which expertise is collected as a whole. As a result, it is possible to construct a dialogue system at a cost lower than a cost required in a case where an expert having expertise creates a scenario. In addition, to implement a dialogue equivalent to the scenario method by using an example usually used in a chat dialogue, a technology of the dialogue control is introduced. The dialogue control is a technology used in a slot-value method task dialogue system, and is not usually used in an example method dialogue system. To introduce the dialogue control, an additional attribute called situation information is combined with an example to be collected. As a result, in the example method dialogue system, it is possible to achieve a highly accurate response depending on a flow or situation of a dialogue like the scenario method.

As illustrated in FIG. 1, a dialogue apparatus 1 of the first embodiment includes, for example, an example storage unit 10-1, a dialogue state storage unit 10-2, a selection rule storage unit 10-3, an example collection unit 11, an utterance reception unit 12, a dialogue state acquisition unit 13, an example selection unit 14, a dialogue state update unit 15, and an utterance presentation unit 16. The dialogue apparatus 1 may include a voice recognition unit 17 and a voice synthesis unit 18. The dialogue apparatus 1 executes processing of each of steps illustrated in FIG. 2, whereby the dialogue method of the first embodiment is implemented.

A dialogue apparatus is a special apparatus configured such that a special program is read by a known or dedicated computer including, for example, a central processing unit (CPU), a main storage device (random access memory (RAM)), and the like. The dialogue apparatus executes each of pieces of processing under control of the central processing unit, for example. Data input to the dialogue apparatus and data obtained in each of the pieces of processing are stored in, for example, the main storage device, and the data stored in the main storage device is read to the central processing unit as necessary and used for other processing. At least some of processing units included in the dialogue apparatus may be configured by hardware such as an integrated circuit. Each of storage units included in the dialogue apparatus can be configured by, for example, a main storage device such as a random access memory (RAM), an auxiliary storage device configured by a hard disk, an optical disk, or a semiconductor memory device such as a flash memory, or middleware such as a relational database or a key value store. The plurality of storage units included in the dialogue apparatus may be implemented as a plurality of physically different storage devices, or may be implemented by logically dividing one storage device into a plurality of areas.

Figure 2:
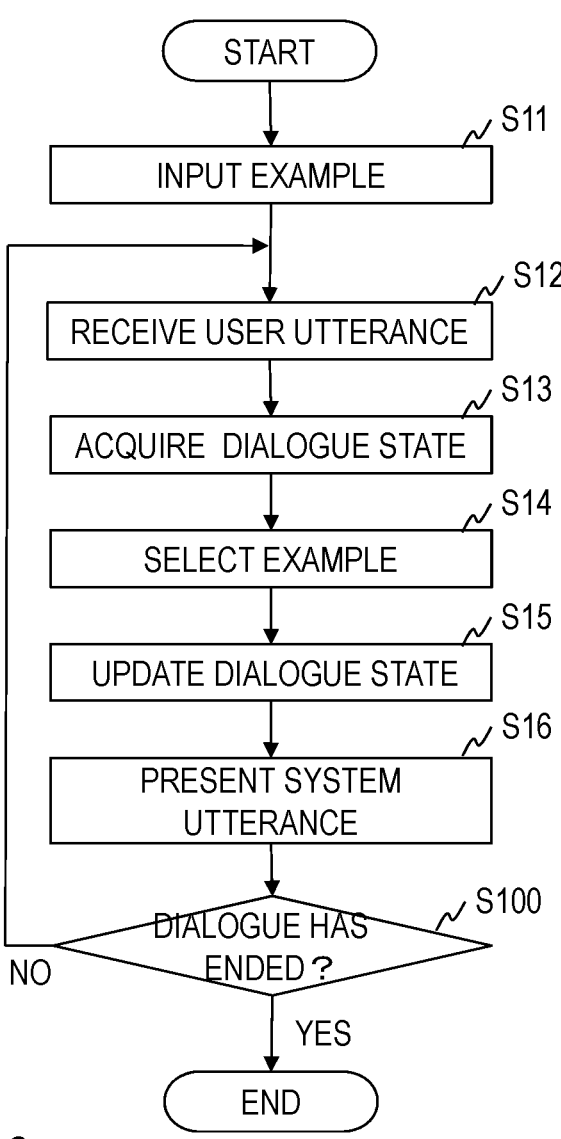
FIG. 2 is a diagram illustrating a processing procedure of a dialogue method of the first embodiment.

Hereinafter, the dialogue method executed by the dialogue apparatus 1 of the first embodiment will be described in detail with reference to FIG. 2.

The dialogue apparatus 1 uses a text representing a content of a user utterance as an input and outputs a text representing a content of a system utterance for responding to the user utterance, thereby executing a dialogue with a user as a dialogue partner. The dialogue executed by the dialogue apparatus 1 may be performed on a text basis or on a voice basis.

When the dialogue is executed on a text basis, the dialogue between the user and the dialogue apparatus 1 is executed by using a dialogue screen displayed on a display unit (not illustrated) such as a display included in the dialogue apparatus 1. The display unit may be installed in a housing of the dialogue apparatus 1 or may be installed outside the housing of the dialogue apparatus 1 and connected to the dialogue apparatus 1 by a wired or wireless interface. The dialogue screen includes at least an input area for inputting a user utterance and a display area for presenting a system utterance. The dialogue screen may include a history area for displaying a history of the dialogue performed from the start of the dialogue to the present, or the history area may also serve as the display area. The user inputs the text representing the content of the user utterance into the input area of the dialogue screen. The dialogue apparatus 1 displays the text representing the content of the system utterance in the display area of the dialogue screen.

In a case where the dialogue is executed on a voice basis, the dialogue apparatus 1 further includes the voice recognition unit 17 and the voice synthesis unit 18. In addition, the dialogue apparatus 1 includes a microphone and a speaker (not illustrated). The microphone and the speaker may be installed in the housing of the dialogue apparatus 1 or may be installed outside the housing of the dialogue apparatus 1 and connected to the dialogue apparatus 1 by a wired or wireless interface. In addition, the microphone and the speaker may be mounted on an android imitating a human or a robot imitating an animal or a fictitious character. In this case, the android or the robot may include the voice recognition unit 17 and the voice synthesis unit 18, and the dialogue apparatus 1 may be configured to input and output the text representing the content of the user utterance or the system utterance. The microphone collects an utterance uttered by the user and outputs a voice representing the content of the user utterance. The voice recognition unit 17 uses the voice representing the content of the user utterance as an input, and outputs the text representing the content of the user utterance that is a voice recognition result for the voice. The text representing the content of the user utterance is input to the utterance reception unit 12. The text representing the content of the system utterance output by the utterance presentation unit 16 is input to the voice synthesis unit 18. The voice synthesis unit 18 uses the text representing the content of the system utterance as an input, and outputs a voice representing the content of the system utterance obtained as a result of voice synthesis of the text. The speaker emits the voice representing the content of the system utterance.

The example storage unit 10-1 stores a plurality of examples input by a plurality of example registrants. The example includes an utterance sentence assumed to be uttered by the user, a response sentence for the system to respond to the utterance, and at least one piece of situation information corresponding to a set of the utterance sentence and the response sentence. The situation information is, for example, information representing a category of a topic being performed in a current dialogue, such as "tourist information" or "administrative procedure". The situation information set to the example by an example registrant may be selected from predefined situation information or may be arbitrarily created by the example registrant.

The example registrant may be an expert having expertise or a non-expert having no expertise. For example, data collection using a website can be performed for inputting an example (see Non Patent Literature 2). In the website, a non-expert only needs to post an utterance sentence representing the content of the user utterance, a response sentence representing the content of the system utterance in response to the user utterance, and situation information in which the user utterance and the system utterance are made, as a set. For example, in a case where a task dialogue related to "tourist information" and "administrative procedure" is assumed, it is sufficient that a person who lives in the region, a person who has lived in the region, a person who is interested in the region, a person who performs the administrative procedure, a person who has performed the administrative procedure, and the like participate as a non-expert partially having knowledge close to expertise. In addition, assuming not only task dialogue such as "tourist information" and "administrative procedure" but also chat dialogue, an example in which the situation information is set to "chat" may be collected in advance and stored in the example storage unit 10-1.

Non Patent Literature 2 describes that many example registrants create an example by completely playing a role of a specific character, but in the present embodiment, it is not essential to create an example by completely playing a role of a specific character. The example registrant may create an example without completely playing a role of a specific character, or an example created by completely playing a role of a specific character and an example created without completely playing a role of a specific character may be mixed.

The dialogue state storage unit 10-2 stores information representing a dialogue state. The dialogue state is information representing a state of the current dialogue, and is determined on the basis of the dialogue performed from the start of the dialogue to the last utterance. In practice, at the time of presenting the last system utterance, the dialogue state update unit 15 described later sets the utterance. An initial value of the dialogue state only needs to be arbitrarily set from the situation information set to any of the examples stored in the example storage unit 10-1. Alternatively, for example, "dialogue start" may be set as a formal dialogue state for the dialogue control. In this case, a formal example in which the situation information is set to "dialogue start" is stored in the example storage unit 10-1 in advance.

The selection rule storage unit 10-3 stores a predefined selection rule. The selection rule represents a correspondence relationship among the dialogue state, the situation information, and the dialogue state of a transition destination, and defines the situation information that can be used in the current dialogue state, and the dialogue state of the transition destination from the current dialogue state in a case where the example of the situation information is selected. The selection rule defines that (1) an example in which the situation information is Y or Z can be selected in a certain dialogue state X, and (2) in a case where an example A with the situation information Z is selected, transition is performed to another dialogue state W different from X or transition is performed to the dialogue state X. Regarding (1), for example, the definition is that (1-1) when the dialogue state is "tourist information", it is possible to select an example in which the situation information is "tourist information", "history", or "shrine". Regarding (2), for example, the definition is that (2-1) when the dialogue state is "tourist information", an example in which the situation information is "gourmet" is selected and an utterance is performed about gourmet topics, and then the dialogue state is caused to transition to "tourist information", (2-2) when the dialogue state is "dialogue start", in a case where an example in which the situation information is "greeting" is selected, the dialogue state is caused to transition to "dialogue waiting", and (2-3) when the dialogue state is "dialogue waiting", in a case where an example in which the situation information is "tourist information" is selected, the dialogue state is caused to transition to "tourist information". In a case where it is enabled for the example registrant to arbitrarily set the situation information when the example is input, every time the situation information is newly added, a selection rule related to the situation information (in which dialogue state the situation information can be selected and to which dialogue state the transition is performed when the situation information is selected, and which dialogue state can be selected in the dialogue state corresponding to the situation information and to which dialogue state the transition is performed when the situation information is selected) is also manually added. In addition, assuming that a chat dialogue is inserted during execution of a task, a selection rule is stored in advance that is defined such that in a case where an example in which the situation information is set to "chat" is collected, for example, when the dialogue state is "administrative procedure" or "tourist information", the example in which the situation information is "chat" can be selected and used as a response sentence.

In step S11, the example collection unit 11 receives an example input from the example registrant and stores the example in the example storage unit 10-1.

In step S12, the utterance reception unit 12 uses the text representing the content of the user utterance input to the dialogue apparatus 1 (or output by the voice recognition unit 17) as an input, and outputs the text representing the content of the user utterance to the dialogue state acquisition unit 13.

In step S13, the dialogue state acquisition unit 13 receives the text representing the content of the user utterance from the utterance reception unit 12, acquires a dialogue state stored in the dialogue state storage unit 10-2 as a dialogue state at the time when the text representing the content of the user utterance is received, and outputs the acquired dialogue state and the text representing the content of the user utterance to the example selection unit 14.

In step S14, the example selection unit 14 receives the dialogue state and the text representing the content of the user utterance from the dialogue state acquisition unit 13, acquires an example (hereinafter, also referred to as "selection example") for responding to the user utterance from the example storage unit 10-1, and outputs the acquired selection example to the dialogue state update unit 15. First, the example selection unit 14 acquires situation information that can be used in the current dialogue state on the basis of the selection rule stored in the selection rule storage unit 10-3. Next, the example selection unit 14 searches for an example stored in the example storage unit 10-1 on the basis of the text representing the content of the user utterance and the situation information that can be used in the current dialogue state. For example, in a case where the current dialogue state is "administrative procedure" and the content of the user utterance is a question sentence, search is performed for an example including a response sentence serving as an answer to the question sentence. It is sufficient that a known method is used as a search method. In addition, in a case where "chat" is acquired as the situation information that can be used in the current dialogue state, search is performed for any example in which the situation information is "chat", or an example having an utterance sentence having a high similarity with the content of the user utterance, from the examples stored in the example storage unit 10-1. Even in a case of searching for the example having an utterance sentence having a high similarity with the content of the user utterance, it is sufficient that a known method is used as a search method. Subsequently, for each of the found examples, the example selection unit 14 calculates a response selection score representing appropriateness as a response on the basis of a search score representing a degree of matching with a search condition, a correspondence relationship between an utterance sentence and a response sentence set in the example, and the like. Then, the example selection unit 14 acquires an example having the highest response selection score as a selection example.

As described above, the selection rule can be defined in a relationship in which examples of the situation information Y and Z can be selected in the dialogue state X, but this is an example. In the dialogue state X, selection by weighting may be performed in which the response selection score is weighted such as *0.8 for an example of the situation information Y and *0.2 for an example of the situation information Z to acquire an example having the highest response selection score. Specifically, assuming that an example in which the situation information is "tourist information" and an example in which the situation information is "shrine" can be selected when the dialogue state is "tourist information", weights are set such as *0.8 for the example in which the situation information is "tourist information" and *0.2 for example in which the situation information is "shrine". At this time, when it is assumed that the response selection score of the example of "tourist information" is 30 and the response selection score of the example of "shrine" is 100, (1) the response selection score of the example of "tourist information" is 30×0.8=24, and (2) the response selection score of the example of "shrine" is 100×0.2=20. In this case, a comparison between (1) and (2) shows that 24>20, and thus the example of "tourist information" is selected.

In step S15, the dialogue state update unit 15 receives the selection example from the example selection unit 14, updates the dialogue state stored in the dialogue state storage unit 10-2 in a case where the dialogue state transitions according to the selection rule used to select the selection example, and outputs a response sentence included in the selection example to the utterance presentation unit 16. The new dialogue state is set in accordance with the selection rule on the basis of the current dialogue state and the situation information included in the selection example. For example, if the current dialogue state is "dialogue start" and the situation information included in the selection example is "administrative procedure", the dialogue state stored in the dialogue state storage unit 10-2 is updated to "administrative procedure" in accordance with the selection rule in which the dialogue state of the transition destination at the time of selecting the example in which the situation information is "administrative procedure" when the dialogue state is "dialogue start" is set to "administrative procedure". In addition, if the current dialogue state is "administrative procedure" and the situation information included in the selection example is also "administrative procedure", the dialogue state is continuously set to "administrative procedure" (the dialogue state is not updated) in accordance with the selection rule in which the dialogue state of the transition destination at the time of selecting the example in which the situation information is "administrative procedure" when the dialogue state is "administrative procedure" is set to "administrative procedure". In addition, if the current dialogue state is "greeting" and the situation information included in the selection example is "administrative procedure", the dialogue state stored in the dialogue state storage unit 10-2 is updated to "administrative procedure" in accordance with the selection rule in which the dialogue state of the transition destination at the time of selecting the example in which the situation information is "administrative procedure" when the dialogue state is "dialogue waiting" is set to "administrative procedure". In addition, for example, priority may be assigned to the situation information, and in a case where the current dialogue state is different from the situation information included in the selection example received from the example selection unit 14, update may be performed in which the situation information with the higher priority is selected and set as a new dialogue state. For example, in a case where an example in which the situation information is "chat" and an example in which the situation information is "administrative procedure" can be selected when the dialogue state is "greeting", the dialogue state is easily updated to "administrative procedure" by setting the priority of "administrative procedure" to be higher in "chat" and "administrative procedure". With this configuration, it is possible to control progress of the dialogue such that the example selection unit 14 easily selects the example of the "administrative procedure" as the next utterance rather than the "chat". In addition, in an example in which it is assumed that utterance is performed only once in one dialogue, such as "self-introduction" or "greeting", control may be performed so that the priority is lowered after the first selection and the example is not selected for the second and subsequent times.

In step S16, the utterance presentation unit 16 receives the response sentence from the dialogue state update unit 15, and presents the response sentence to the user by a predetermined method as a text representing the content of the system utterance. In a case where the dialogue is executed on a text basis, the text representing the content of the system utterance is output to the display unit of the dialogue apparatus 1. In a case where the dialogue is executed on a voice basis, the text representing the content of the system utterance is input to the voice synthesis unit 18, and a voice representing the content of the system utterance output by the voice synthesis unit 18 is reproduced from a predetermined speaker.

In step S100, the dialogue apparatus 1 determines whether or not the current dialogue has ended. In a case where it is determined that the current dialogue has ended (YES), the processing is ended, and waiting is performed until the next dialogue starts. In a case where it is determined that the current dialogue has not ended (NO), the processing returns to step S12, and the next user utterance is received. Dialogue end determination only needs to be performed by determining whether or not the current state is a predefined end state. It is sufficient that the predefined end state is defined as, for example, a state in which the situation information is updated to "end", a state in which the user or the system has uttered a predetermined greeting sentence such as "This is all." or "Thank you.", or the like.

Specific Example of First Embodiment

Hereinafter, a specific example of the dialogue achieved by the dialogue apparatus 1 of the first embodiment will be described assuming a task dialogue system capable of selectively executing two tasks of "tourist information" and "administrative procedure".

It is assumed that, for example, following Examples 1 to 5 are stored in the example storage unit 10-1. Note that an example in which two pieces of situation information X and Y are written together, such as "X/Y", represents that a plurality of pieces of situation information is assigned to one example.

Example 1: User Utterance "do I Need a Certificate of Residence for Final Tax Return?"

System response: "If you have My Number Card, you do not need a certificate of residence. However, if you don't have My Number Card, a certificate of residence or a copy of family register with an individual number will be required."
Situation information: Administrative procedure/Final tax return

Example 2: User Utterance "where can My Number Card be Issued?"

System response "It can be issued at the general counter."
Situation information: Administrative procedure/Individual number

Example 3: User Utterance "is there any Specialty?" System Response "Keihanna has a Lot of Nature and Delicious Air."

Situation information: Tourist information/Specialty

Example 4: User Utterance "Hello"

System response "Hello, how may I help you today?"
Situation information: Greeting

Example 5: User Utterance " "

System response "How may I help you?"
Situation information: Administrative procedure/Dialogue start

Example 6: User Utterance "not Particularly"

System response "Understood. Thank you for using."
Situation information: End
In a case where a dialogue is newly started, and the current dialogue state is set to "dialogue start" as the initial value, and the dialogue apparatus passively waits for an utterance of the user, the dialogue apparatus waits until an utterance from the user is made while the dialogue state remains "dialogue start". If a selection rule is set that an example in which the situation information is "greeting" is available when the dialogue state is "dialogue start", the dialogue apparatus selects Example 4 to which the situation information of "greeting" is assigned, and outputs a system utterance of "How may I help you?" to the user. At this time, in a case where an example in which the situation information is "greeting" is selected when the dialogue state is "dialogue start", if a selection rule is set that the dialogue state is caused to transition to "administrative procedure", the dialogue state transitions to "administrative procedure".
In an example in which it is assumed that the dialogue apparatus spontaneously makes an utterance to the user as in Example 5, the user utterance does not have to be set. Example 5 is registered in advance as a formal example used to transition the state of the dialogue in the dialogue control.
In a case where a new dialogue is started, and the current dialogue state is set to "dialogue start" as the initial value, and the dialogue apparatus makes a spontaneous utterance, Example 5 is selected to which the situation information of "dialogue start" is assigned, and the system utterance "How may I help you?" is output to the user. At this time, if a selection rule is set that the dialogue state transitions to "administrative procedure" in a case where an example in which the situation information is "administrative procedure" is selected when the current dialogue state is "dialogue start", the dialogue state transitions to "administrative procedure" since "administrative procedure" is also assigned to the situation information of the selection example (Example 5). Thereafter, in a case where the user utters "Where can My Number Card be issued?", Example 2 matching the content of the user utterance is selected from among the examples to which the situation information that can be used in the current dialogue state "administrative procedure" is assigned (here, it is assumed that "administrative procedure" is set in the selection rule), and the system utterance "It can be issued at the general counter." is output. At this time, if a selection rule is set that the dialogue state remains in "administrative procedure" in a case where an example in which the situation information is "administrative procedure" is selected when the current dialogue state is "administrative procedure", the dialogue state continues to be "administrative procedure" since the situation information of the selection example (Example 2) is "administrative procedure".
In a case where the dialogue apparatus utters "How may I help you?" to the user, and then the user utters "Not particularly", Example 6 matching the content of the user utterance is selected and the system utterance of "Understood. Thank you for using." is output. In this case, if a selection rule is set that transition is performed to "end" in a case where an example in which the situation information is "end" is selected when the current dialogue state is "administrative procedure", the dialogue state transitions to "end" since the situation information of the selection example (Example 6) is "end". The dialogue apparatus in which the dialogue state is "end" performs end processing for the current dialogue and waits until the next dialogue is started.
In the above specific example, an example has been described of a dialogue in which a task such as "administrative procedure" or "tourist information" is executed; however, it is also possible to insert a chat dialogue during execution of the task. In this case, as described above, a selection rule is predefined that is defined so that an example in which the situation information is "chat" is selected and can be set as a response sentence when the dialogue state is "administrative procedure" or "tourist information", and is stored in the selection rule storage unit 10-3. In addition, an example in which the situation information is set to "chat" is collected in advance and stored in the example storage unit 10-1. For example, a selection rule is defined so that in a case where the user utters a topic considered as a chat even during guidance of an administrative procedure, an example in which the situation information is "chat" is selected and a dialogue can be performed according to the topic of the user utterance. As described above, by inserting the chat during a task dialogue, it is possible to alleviate tension of the user or to develop a sense of closeness to the dialogue apparatus, and an effect is expected of causing the user to further concentrate on the dialogue.

For example, a flow of a task dialogue in a case where no chat is inserted is as follows.

> User: "Hello" (dialogue state: dialogue start)
>
> System: (Respond with an example in which situation information is greeting) (situation information: greeting, dialogue state: transition to dialogue waiting)
>
> User: "Where is My Number Card?" (dialogue state: administrative procedure)
>
> System: (Respond with an example in which situation information is counter guidance) (situation information: counter guidance, dialogue state: transition to counter guidance)
>
> User: "Where is the certificate of residence? Where is the proof of tax payment?" (dialogue state: administrative procedure)
>
> System: (Respond with an example in which situation information is counter guidance)

For example, when the dialogue state is "administrative procedure" or "counter guidance", a higher weight is given to the example in which the situation information is "administrative procedure" or "counter guidance", whereby the example of "administrative procedure" or "counter guidance" is easily selected.

For example, a flow of a task dialogue in a case where a chat is inserted is as follows.

> User: Hello (dialogue state: dialogue start)
>
> System: Return an example in which situation information is greeting (transition to situation information: greeting, dialogue state: dialogue waiting)
>
> User: It's good weather today. (dialogue state: chat)
>
> System: Respond with an example in which situation information is chat (transition to situation information: chat, dialogue state: chat)

For example, setting is performed so that an example in which the situation information is "chat" has a large weight when the dialogue state is "chat", whereby the example in which the situation information is "chat" is easily selected.

As described above, by introducing the dialogue control based on the selection rule, a designer can arbitrarily determine what kind of dialogue is desired to proceed in what kind of dialogue state even in the example method dialogue system.

Second Embodiment

Figure 3:
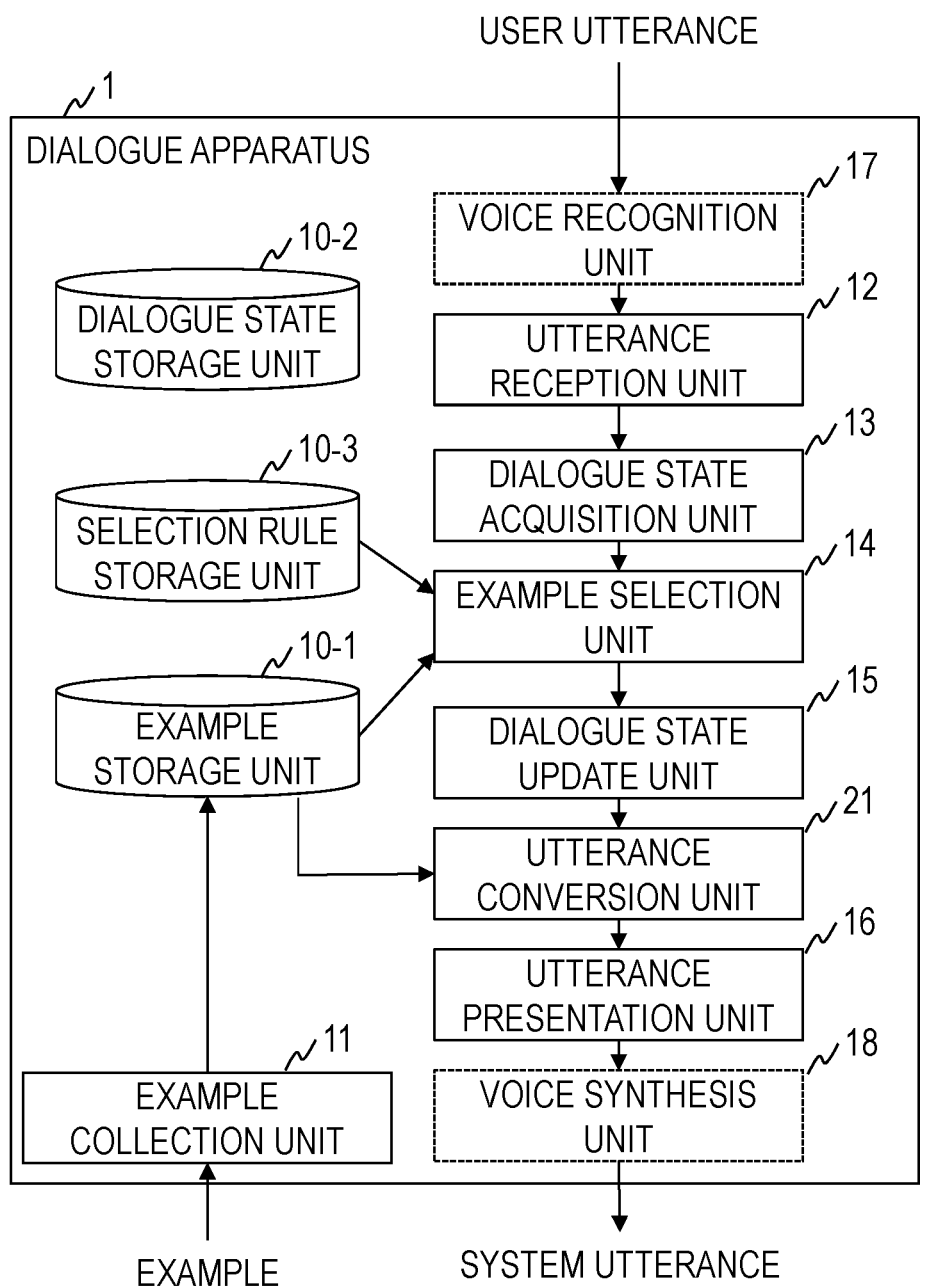
FIG. 3 is a diagram illustrating a functional configuration of a dialogue apparatus of a second embodiment.

A second embodiment of the present invention is a dialogue apparatus and a dialogue method capable of paraphrasing a system utterance presented by the dialogue apparatus 1 of the first embodiment into an utterance completely playing a role of that of a specific character and presenting the utterance. As illustrated in FIG. 3, a dialogue apparatus 2 of the second embodiment includes the example storage unit 10-1, the dialogue state storage unit 10-2, the selection rule storage unit 10-3, the example collection unit 11, the utterance reception unit 12, the dialogue state acquisition unit 13, the example selection unit 14, the dialogue state update unit 15, and the utterance presentation unit 16 included in the dialogue apparatus 1 of the first embodiment, and further includes an utterance conversion unit 21. The dialogue apparatus 2 may include the voice recognition unit 17 and the voice synthesis unit 18 similarly to the first embodiment. The dialogue apparatus 2 executes processing of each of steps illustrated in FIG. 4, whereby the dialogue method of the second embodiment is implemented.

Figure 4:
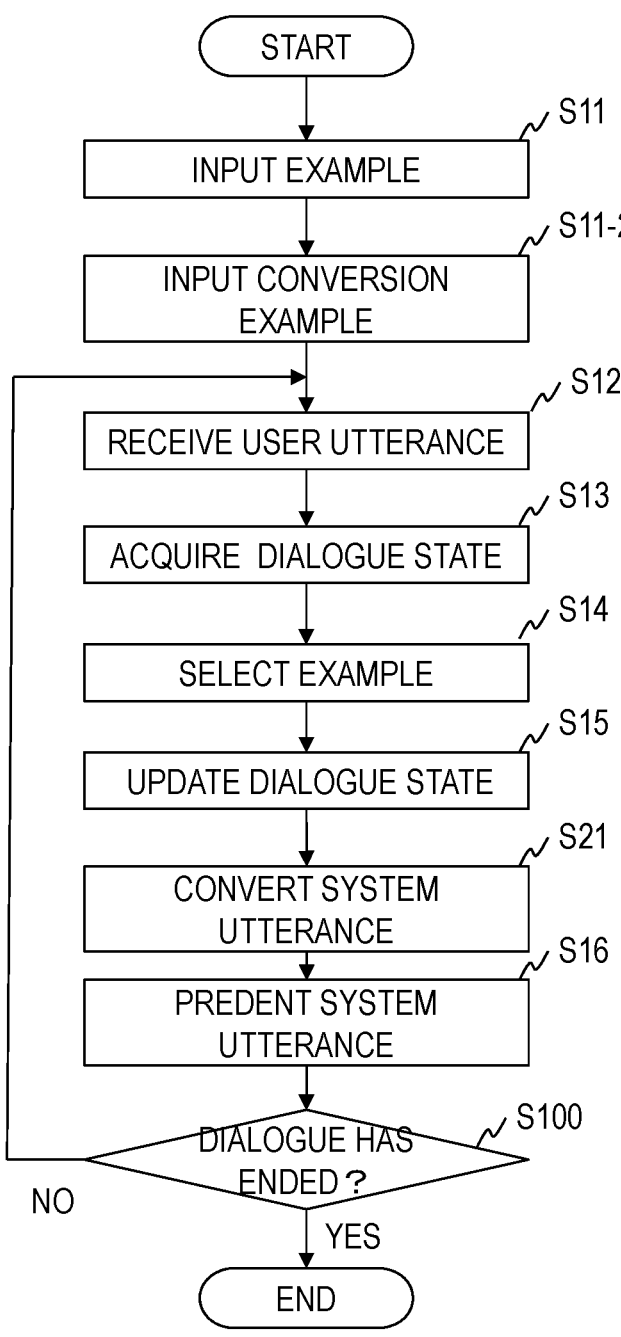
FIG. 4 is a diagram illustrating a processing procedure of a dialogue method of the second embodiment.

Hereinafter, the dialogue method executed by the dialogue apparatus 2 of the second embodiment will be described focusing on differences from the first embodiment with reference to FIG. 4.

In step S11-2, the example collection unit 11 receives a conversion example input from the example registrant and stores the conversion example in the example storage unit 10-1. The conversion example is an example for converting a certain utterance sentence into an utterance sentence obtained by paraphrasing the certain utterance sentence. The rephrased utterance sentence is, for example, an utterance sentence when a role of a specific character is completely played and a certain utterance sentence is uttered. The conversion example includes an utterance sentence before conversion (that is, an utterance sentence that can be presented in an existing dialogue system), an utterance sentence after conversion (that is, an utterance sentence when it is assumed that a specific character utters an utterance sentence before conversion), and situation information indicating a target character such as "paraphrase of <a specific character>".

In step S21, the utterance conversion unit 21 receives a response sentence from the dialogue state update unit 15, converts the received response sentence into a response sentence obtained by paraphrasing the received response sentence by using the conversion example stored in the example storage unit 10-1, and outputs the converted response sentence to the utterance presentation unit 16.

The utterance presentation unit 16 of the second embodiment receives the converted response sentence from the utterance conversion unit 21, and presents the converted response sentence to the user by a predetermined method as a text representing the content of the system utterance.

Modification

In the above embodiment, the configuration has been described in which the dialogue apparatus includes the dialogue state storage unit 10-2 and the dialogue state acquisition unit 13 reads the dialogue state stored in the dialogue state storage unit 10-2 to acquire the current dialogue state. However, it is also possible to configure the dialogue apparatus such that the dialogue state acquisition unit 13 estimates the dialogue state on the basis of a progress situation of the dialogue or the like. In this case, the dialogue apparatus does not have to include the dialogue state storage unit 10-2 and the dialogue state update unit 15. For example, in a case of a slot-value method dialogue system that executes a task by analyzing a content of a user utterance and filling a value corresponding to a predefined slot, the next state can be estimated from a filling state of a slot value. For the estimation, language understanding using sequential labeling such as conditional random fields (CRF) and a neural network (NN) can be used. In this method, for an input sentence such as "Where can My Number Card be issued?", it is estimated which portion corresponds to which slot. Specifically, it is estimated as "(Where: asking) can (My Number Card: object) be (issued: work)?". Then, the estimated "'Where": asking, "My Number Card": object, "issued": work' is input to a slot value. If there is an example corresponding to a combination of "'Where": asking, "My Number Card": object, "issued": work' in the example storage unit 10-1, the example is output as a selection example. In a case where there is no example corresponding to the combination, it is attempted to output an example corresponding to the most similar combination, or make an utterance inquiring of the user a slot that is a difference between the most similar combination and a current combination, update or additionally write a content of the slot, and output an example corresponding to the combination again. For example, if a slot value is filled like 'asking: where, object: toilet', the dialogue state can be estimated as "town hall guidance", and a corresponding response of "The toilet is on the east side of each floor" can be selected. For example, a response corresponding to a slot value that is already filled may be selected from among a plurality of predetermined slots, or a response sentence inquiring a content of a slot that is not yet filled may be selected.

With the above configuration, according to the dialogue apparatus of the present invention, the dialogue system for achieving a predetermined task can be constructed at low cost. First, by collecting examples from a plurality of example registrants, it is possible to construct a dialogue system having expertise regarding a task in a collective intelligence manner. A scenario formed by succession of conditional branches needs to be created to have consistency by an expert having expertise about the entire task, but a non-expert having only partial knowledge about the task can create the scenario in a case of an example created by one question and one response, so that the cost for constructing the dialogue system can be reduced. In addition, by adding an attribute of the situation information to the example and defining the available situation information depending on the dialogue state, a series of dialogues such as a scenario can be achieved using the example. Further, by setting information corresponding to the task in the dialogue state or the situation information, it is possible to simultaneously execute a plurality of tasks. In a scenario method dialogue system, the dialogue control is necessary that appropriately combines a plurality of scenarios corresponding to the tasks created by an expert; however, in the present invention, a dialogue system capable of simultaneously executing a plurality of tasks can be easily implemented as long as a selection rule for transition between tasks is defined.

While the embodiments of the present invention have been described above, a specific configuration is not limited to these embodiments, and it goes without saying that an appropriate design change or the like not departing from the gist of the present invention is included in the present invention. The various types of processing described in the embodiments may be executed not only in chronological order in accordance with the described order, but also in parallel or individually depending on the processing capability of a apparatus that executes the processing or as necessary.

[Program and Recording Medium]

Figure 5:
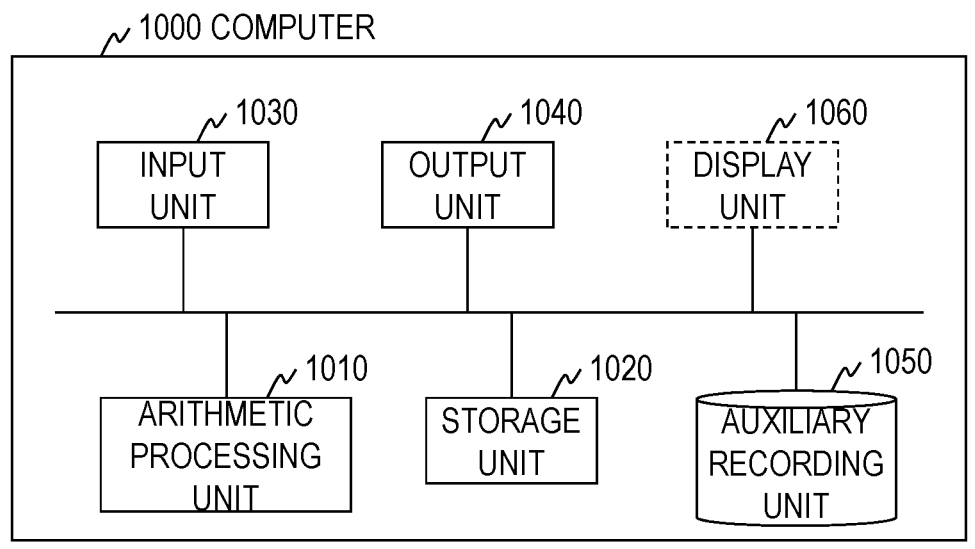
FIG. 5 is a diagram illustrating a functional configuration of a computer.

In a case where various types of processing functions in each apparatus described in the embodiments are implemented by a computer, processing content of the functions of each apparatus is described by a program. Then, by causing a storage unit 1020 of a computer illustrated in FIG. 5 to read this program and causing an arithmetic processing unit 1010, an input unit 1030, an output unit 1040, and the like to execute the program, the various types of processing functions in each apparatus are implemented on the computer.

The program describing the processing content can be recorded on a computer-readable recording medium. The computer-readable recording medium is, for example, a non-transitory recording medium, and is a magnetic recording device, an optical disc, or the like.

In addition, distribution of the program is performed by, for example, selling, transferring, or renting a portable recording medium such as a DVD or a CD-ROM on which the program is recorded. Further, a configuration may also be employed in which the program is stored in a storage device in a server computer and the program is distributed by transferring the program from the server computer to other computers via a network.

For example, the computer that executes such a program first temporarily stores the program recorded in the portable recording medium or the program transferred from the server computer in an auxiliary recording unit 1050 that is a non-transitory storage device of the computer. In addition, when executing processing, the computer reads the program stored in the auxiliary recording unit 1050 that is a non-transitory storage device of the computer, into the storage unit 1020 that is a temporary storage device, and executes processing according to the read program. In addition, as another execution form of the program, the computer may directly read the program from the portable recording medium and execute processing according to the program, and the computer may sequentially execute processing according to a received program each time the program is transferred from the server computer to the computer. In addition, the above-described processing may be executed by a so-called application service provider (ASP) type service that implements a processing function only by an execution instruction and result acquisition without transferring the program from the server computer to the computer. The program in the present embodiment includes information used for a process by an electronic computer and equivalent to the program (data or the like that is not a direct command to the computer but has a property that defines processing by the computer).

In addition, although the present apparatus is configured by executing a predetermined program on the computer in the present embodiment, at least part of the processing content may be implemented by hardware.

The invention claimed is:

1. A dialogue apparatus comprising a processor executing computer-executable instructions that cause the dialogue apparatus to perform operations comprising:

collecting and storing a plurality of example dialogues in an example dialogue store, wherein an example dialogue of the plurality of example dialogues comprises an utterance sentence, a response sentence, and situation information, the situation information indicates a category of a topic performed in a dialogue by the utterance sentence and the response sentence, the example dialogue of the plurality of example dialogues describes a partial knowledge of the category of the topic, and the plurality of example dialogues in aggregate represents a collective intelligence of the category of the topic;

receiving a user utterance of a current dialogue as uttered by a user;

retrieving, based on a current dialogue state of the current dialogue, a selection rule from a selection rule store, wherein the selection rule comprises a dialogue state of a dialogue, situation information that is available in the dialogue state, and a destination dialogue state describing a transition destination of the dialogue in response to a selection of situation information of the dialogue, and the current dialogue state of the current dialogue corresponds to the dialogue state of the dialogue;

selecting, based on the user utterance, the selection rule, and the situation information available during the current dialogue state, the example dialogue as a selection example dialogue from the example dialogue store; and creating and outputting, to a predetermined device, a system utterance as a response to the user utterance based on the response sentence of the selection example dialogue, thereby enabling responding to the user utterance based on the collective intelligence of the category of the topic with accuracy.

2. The dialogue apparatus according to claim 1, wherein the selecting further comprises acquiring the situation information available in the current dialogue state from the selection rule, and further selecting, as the selection example dialogue, the example dialogue, the example dialogue comprises the response sentence serving as an answer to the user utterance among the plurality of example dialogues, and the selection example dialogue comprises the acquired situation information.

3. The dialogue apparatus according to claim 2, wherein the selecting further comprises storing a conversion example dialogue, the conversion example dialogue comprises a first utterance sentence before conversion into a second utterance sentence, the second utterance sentence after the conversion, and information indicating a character of a robot presenting the second utterance sentence, and the computer-executable instructions further cause the dialogue apparatus to perform operations comprising:

converting the response sentence of the selection example dialogue into another response sentence for utterance according to a predetermined character of the robot by using the conversion example dialogue.

4. The dialogue apparatus according to claim 3, the computer-executable instructions further cause the dialogue apparatus to perform operations comprising:

storing the current dialogue state; and updating the current dialogue state to the dialogue state of the transition destination included in the selection rule, wherein the selecting the selection example further comprises selecting the selection example by using the stored current dialogue state.

5. The dialogue apparatus according to claim 4, wherein the selecting the selection example further comprises selecting the selection example by weighting the situation information available in the current dialogue state.

6. The dialogue apparatus according to claim 3, further comprising estimating the current dialogue state on a basis of a progress situation from a start of a dialogue to a present, wherein the selecting the selection example further comprises selecting the selection example by using the estimated current dialogue state.

7. The dialogue apparatus according to claim 6, wherein the selecting the example dialogue further comprises selecting the selection example dialogue by weighting the situation information available in the current dialogue state more than another situation information available in the current dialogue state according to the selection rule.

8. A non-transitory computer-readable recording medium storing computer-executable instructions that when executed by a processor cause a computer to execute operations as the dialogue apparatus according to claim 1.

9. A dialogue method, comprising:

collecting and storing a plurality of example dialogues in an example dialogue store, wherein an example dialogue of the plurality of example dialogues comprises an utterance sentence, a response sentence, and situation information, the situation information indicates a category of a topic performed in a dialogue by the utterance sentence and the response sentence, the example dialogue of the plurality of example dialogues describes a partial knowledge of the category of the topic, and the plurality of example dialogues in aggregate represents a collective intelligence of the category of the topic;

receiving a user utterance of a current dialogue as uttered by a user;

retrieving, based on a current dialogue state of the current dialogue, a selection rule from a selection rule store, wherein a selection rule comprises a dialogue state of a dialogue, situation information that is available in the dialogue state, and a destination dialogue state describing a transition destination of the dialogue in response to a selection of situation information of the dialogue, and the current dialogue state of the current dialogue corresponds to the dialogue state of the dialogue;

selecting, based on the user utterance, the selection rule, and the situation information available in the current dialogue state, an example dialogue as a selection example dialogue from the example dialogue store; and presenting, to the user, a system utterance as created based on the response sentence of the selection example dialogue, thereby enabling responding to the user utterance based on the collective intelligence of the category of the topic with accuracy.

\* \* \* \* \*